June 18, 1957 R. W. HUGG 2,796,079
FAUCET
Filed May 19, 1953
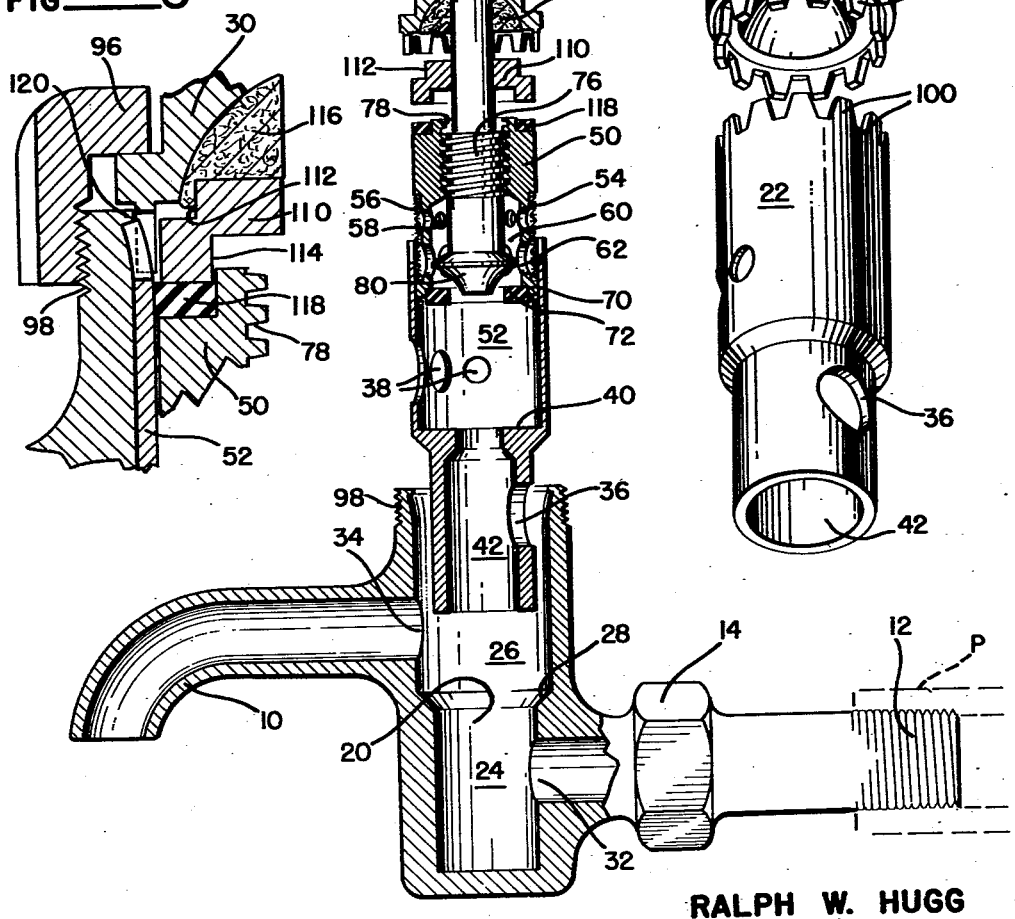
RALPH W. HUGG
INVENTOR
BY Smith & Tuck

United States Patent Office 2,796,079
Patented June 18, 1957

2,796,079
FAUCET

Ralph W. Hugg, Cle Elum, Wash., assignor of one-half to C. A. Grosgebauer, Cle Elum, Wash.

Application May 19, 1953, Serial No. 356,035

6 Claims. (Cl. 137—614.17)

My invention relates to the construction of valves, and more particularly, to a faucet. The faucet has means permitting repair of the same by shutting off the water supply at the faucet. This part is constructed in a new assembly including improved means for sealing the operating parts from leakage. The purpose of my invention is to provide a faucet adapted to perform various functions which are desirable in many uses.

It has been recognized desirable in some installations to provide means for shutting off a water source at the valve or faucet for purposes of repair of the same, i. e., replacement of a washer. In any valve or faucet the provision of efficient packing means for effectively sealing the valve operating parts is important. Likewise provision for easy disassembly is valued. Means for adjusting the effective size of the water passageway is useful for adjusting a faucet according to the pressure of the water supply.

The objectives of my invention include, therefore: to provide an improved faucet construction permitting the shutting off of the source of water at the faucet for repairs; to devise improved sealing means for the operating part to prevent leakage of water; to provide for rapid disassembly of the part for repairs; and to devise means for adjusting the effective size of the faucet water passageway.

My invention will be best understood, together with additional objectives and advantages thereof, from the following description when read with reference to the drawings, in which:

Figure 1 is a view showing, partly in section and in exploded form, the various parts of a specific embodiment of my faucet construction;

Figure 2 is an enlarged, perspective view of the valve sleeve and its nut; and

Figure 3 is a fragmentary sectional view, on an enlarged scale, showing certain details of construction.

My structure finds its greatest utility in faucets even though it will be apparent that the disclosure could be followed in the construction of a valve in other environments. The faucet shown in Figure 1 has a conventional spout 10 and has means at its other end for connection to an inlet pipe P, shown in dotted lines, including exterior threads 12 and enlarged hexagonal boss 14 for the application of a wrench in installing the faucet.

The faucet has an upright valve chamber 20 of circular horizontal cross section to permit rotation of valve sleeve 22 therein. Valve chamber 20 has a lower portion 24 of smaller diameter and an upper portion 26 of larger diameter joined by a beveled portion 28. The exterior surface of sleeve 22 is similarly formed so as to make a close fit with the chamber to prevent flow of water therebetween. This fit is not so tight as to prevent rotation of the valve sleeve by means of force applied to the flanged nut 30.

An inlet port 32 communicates with lower chamber portion 24 and a vertically separated outlet port 34 communicates with upper chamber portion 26. Registering with these ports are inlet opening 36 and outlet openings 38 in sleeve 22. In one position inlet opening 36 and the largest outlet opening 38 are coextensive with ports 32, 34 permitting maximum flow therebetween.

Upon rotation of valve sleeve 22 to the proper position, port 32 is completely blocked preventing flow of water into the faucet. If one of the outlet openings 38 is still in registry with outlet port 34 while inlet port 32 is blocked, then the internal annular flange valve seat 40 may be freed from water by running a finger or other object into the lower portion 42 of valve sleeve 22 displacing excess water out the opening. An additional purpose is served by rotating the valve sleeve to the point where inlet opening 36 is only partially registered with inlet port 32 and one of the smaller openings 38 is aligned with outlet port 34 by which means the rate of flow through the faucet may be controlled.

Valve plug 50, positioned in the upper portion 52 of valve sleeve 22, has an annular central portion 54 of reduced diameter in which a screen 56 is positioned serving to collect debris such as rust particles. This reduced portion has a series of upper openings 58 and lower openings 62 permitting the flow of water through the lower enlarged counterbore 60 to outlet port 34. The action of screen 56 together with the restriction of openings 58, 62, serve to divide the stream of water at this point and to cause turbulence in the same resulting in a divided "no-splash" stream similar to that produced by the various aerating nozzles installed on faucet spouts.

The lower end of valve plug 50 has an annular recess 70 in which is seated a resilient ring washer 72 which is pressed between the valve plug and valve seat 40. Valve stem 74 has a threaded portion 76 coacting with matching threads in the threaded bore 78 of valve plug 50 whereby tapered valve end 80 on valve stem 74 may be moved vertically from a lower position, compressing resilient washer 72 against valve seat 40 sealing the faucet to various upper positions, at which different rates of flow through the faucet can be obtained.

Faucet handle 90 is secured to the squared upper end 92 of the valve stem by screw 94. The assembly is secured in place by bonnet ring 96 having interior threads engaging threads 98 on the valve chamber body. The upper end of nut 30 extends above bonnet ring 96 and may be turned without removal of the bonnet ring for either shutting off the water or adjusting the rate of flow through the faucet.

The upper edge of valve sleeve 22 is crenelated as is shown at 100 and flange nut 30 has teeth 102 engaging the crenelations. A pressure ring 110 is interposed between valve plug 50 and nut 30. Among other purposes, this ring is used to form an upper limit for the withdrawal of valve stem 74 by abutment of threads 76 thereagainst. The upper portion of pressure ring 110 is reduced as at 112 and has a counterbore 114. The reduced portion 112 and the counterbore 114 have such size as not to directly contact nut 30 and valve plug 50, respectively, but instead rest on packing 116 and resilient ring washer 118, whereby the pressure exerted by bonnet ring 96 is transmitted by the nut 30 and ring 110 directly on packing 116 and ring 118 so as to cause these members to form an effective seal. As shown in Figure 3, this causes ring 118 to outwardly expand against the inner wall of valve sleeve 22 to seal the assembly at this point. As further shown in Figure 3, ring 118 is pressed on all four sides by plug 50, ring 110, and sleeve 52, which avoid excessive distortion of ring 118. This is a new and important feature because, by the four-directional compression, the original dimensions and resilient properties of ring 118 are substantially preserved and this gasket will have a longer life than otherwise possible. Likewise washer 72 is substantially enclosed, when compressed, by seat 40, the walls of recess 72 and valve 80 which minimizes distortion of the washer. Another related factor which leads to longer life of washer 72 is the absence of a valve seat of the type which mates with an annular groove in a washer. Instead washer 72 coacts with smooth surfaces on valve 80 and valve seat 40.

In Figure 3 is shown also a feature which may optionally be used in which the inner annular undercut shoulder 120 on valve chamber 20 is engaged by crenelations 100 which are in this case outwardly flared under shoulder 120. With some slight resiliency to the metal forming sleeve 22, the flared crenelations will bend inward in initially positioning valve sleeve 22 in valve chamber 20 and will spring into place under shoulder 120 in non-returnable engagement.

In disassembling the faucet for maintenance such as replacement of resilient ring washer 72, nut 30 is gripped with a wrench and through the action of teeth 102 valve sleeve 22 is rotated to a position blocking inlet port 32. Bonnet ring 96 may have to be loosened to permit rotation of nut 30. With the flow of water thus blocked, bonnet ring 96 may be removed and the various valve parts may be pulled upward to completely free the parts for such maintenance.

It will be observed that this faucet construction has many advantageous features. I do not wish to be limited to the exact construction shown and described but wish to cover those modifications within the scope of the invention as described in the appended claims.

I claim:

1. A faucet, comprising: a valve body having vertically separated inlet and outlet ports communicating with an upright chamber therebetween, said chamber having walls having a circular outline in transverse cross-section; a hollow valve sleeve rotatably journalled in said chamber in close fitting relation to said walls, said sleeve having an internal annular flange disposed between vertically spaced apart inlet and outlet openings registrable with said inlet and outlet ports, said sleeve being crenelated around its upper edge; a valve plug fitted in said sleeve above the annular flange and having an upper central threaded bore and a lower enlarged ported counterbore providing flow communication between said inlet and outlet ports; a resilient ring washer disposed between the lower edge of said valve plug and said annular flange; a valve stem threadedly engaged in said threaded bore and having on its lower end, located within said counterbore, a tapered valve cooperable with said ring washer to control the passage of fluid between said inlet and outlet openings; a flanged nut rotatable upon said valve stem and having teeth engaged in the crenelated upper edge of said sleeve to permit rotation thereof from outside said valve body; first packing means between said nut and said plug about the valve stem to seal the same in a fluid tight manner, and a second packing means between said nut and plug and outwardly expansible against the inner wall of the sleeve; and a bonnet ring around said nut engaging the flange thereof and threadedly coupled to said valve body to retain the assembly.

2. A faucet, comprising: a valve body having vertically separated inlet and outlet lateral ports communicating with an upright chamber therebetween, said chamber having walls having a circular outline in transverse cross-section; a hollow valve sleeve rotatably journalled in said chamber in close fitting relation to said walls, said sleeve having an internal annular flange disposed between vertically spaced apart inlet and outlet openings registrable with said inlet and outlet ports in one position and blocking the ports in another position, said sleeve being crenelated around its upper edge; a valve plug fitted in said sleeve above the annular flange and having an upper central threaded bore and a lower enlarged ported counterbore providing flow communication between said inlet and outlet ports; a resilient ring washer disposed between and abutting the lower edge of said valve plug and said annular flange; a valve stem threadedly engaged in said threaded bore and having on its lower end, located within said counterbore, a valve cooperable with said ring washer to control the passage of fluid between said inlet and outlet openings; a flanged nut rotatable upon said valve stem and having teeth engaged in the crenelated upper edge of said sleeve to permit rotation thereof from outside said valve body; packing means between said nut and said plug about the valve stem to seal the same in a fluid tight manner; and a bonnet ring around said nut engaging the flange thereof and threadedly coupled to said valve body to retain said assembly, a portion of said nut extending above said bonnet ring permitting rotation thereof without removal of said bonnet ring.

3. The subject matter of claim 2 in which said valve sleeve has a plurality of outlet openings including a larger outlet opening fully registering with said outlet port when said inlet opening is fully registered with said inlet port and a smaller outlet opening registering with said outlet port when said inlet opening is only partially registered with said inlet port whereby flow of water through the valve may be controlled by the position of the valve sleeve.

4. A faucet, comprising: a valve body having vertically separated inlet and outlet lateral ports communicating with an upright chamber therebetween, said chamber having a circular outline in transverse cross-section; a hollow valve sleeve rotatably journalled in said chamber in close fitting relation to said walls, said sleeve having an internal annular flange disposed between vertically spaced apart inlet and outlet openings registrable with said inlet and outlet ports in one position and blocking the ports in another position; a valve plug fitted in said sleeve immediately above the annular flange and having an upper central threaded bore and a lower enlarged counterbore extending to adjacent said flange and providing flow communication between said inlet and outlet ports, said valve plug having a series of openings through the wall of said lower counterbored portion and the exterior surface of said valve plug having a central reduced portion and an annular screen positioned in said reduced portion and covering said series of openings; a valve stem threadedly engaged in said threaded bore and having on its lower end located within said counterbore a valve cooperable with said annular flange to control the passage of fluid between said inlet and outlet openings; and sealing means threadedly coupled to the top of said valve body and covering said valve plug to secure the parts in place and to seal the assembly including means for rotating said sleeve to a position blocking said outlet port before said sealing means is removed.

5. The subject matter of claim 1 in which there is a metal pressure ring interposed between and spaced from said nut and said plug and interposed between and abutting said first and second packing means whereby pressure exerted on the assembly by the bonnet ring is transmitted from the nut to the first packing means to the pressure ring to the second packing means to the plug to the ring washer to the flange of the sleeve sealing the assembly and securing the plug against rotation.

6. The subject matter of claim 2 in which said chamber has an inner annular undercut shoulder adjacent its upper edge and the upper crenelated edge of said sleeve is outwardly flaring under said shoulder latching said sleeve against upward movement in said chamber.

References Cited in the file of this patent

UNITED STATES PATENTS

| 827,521 | Felsberg | July 31, 1906 |
|---|---|---|
| 1,066,426 | Celie | July 1, 1913 |
| 1,173,157 | Allen | Feb. 29, 1916 |
| 1,635,875 | Albrecht | July 12, 1927 |
| 1,814,330 | Orr | July 14, 1931 |

FOREIGN PATENTS

| 637,448 | France | of 1928 |